(12) United States Patent
Wilkens et al.

(10) Patent No.: US 6,763,933 B1
(45) Date of Patent: Jul. 20, 2004

(54) RECIPROCATING FLOOR CONVEYOR

(75) Inventors: Arthur L. Wilkens, Stockton, KS (US); Michael A. Aldridge, Jr., Plainville, KS (US)

(73) Assignee: Wilkens Manufacturing, Stockton, KS (US)

( * ) Notice: Subject to any disclaimer, the term of this patent is extended or adjusted under 35 U.S.C. 154(b) by 0 days.

(21) Appl. No.: 10/716,233

(22) Filed: Nov. 18, 2003

(51) Int. Cl.[7] .............................................. B65G 25/00
(52) U.S. Cl. .................................................. 198/750.3
(58) Field of Search .......................... 198/750.1, 750.2, 198/750.3, 750.5, 750.7

(56) References Cited

U.S. PATENT DOCUMENTS

| | | | | |
|---|---|---|---|---|
| 5,335,778 A | * | 8/1994 | Wilkins | 198/750.3 |
| 5,547,067 A | * | 8/1996 | Foster | 198/750.3 |
| 5,806,660 A | * | 9/1998 | Foster | 198/750.3 |
| 6,585,106 B1 | * | 7/2003 | Foster | 198/750.3 |

* cited by examiner

Primary Examiner—James R. Bidwell
(74) Attorney, Agent, or Firm—Reising, Ethington, Barnes, Kisselle & Learman, P.C.

(57) ABSTRACT

The reciprocating floor conveyor employs slide bearings with a base, a left side wall, a right side wall, and left and right wings that extend outward from the side walls. The base has a lower surface that sits on cross beams between adjacent guide beams. The left wing sits on the left guide beam. The right wing sits on the right guide beam. A left upper finger snaps under a support plate on the left guide beam and a right upper finger snaps under a support plate on the right guide beam to hold the slide bearing in place. The slide bearing extends from the front of the conveyor to the rear of the conveyor and seals the opening between adjacent guide beams that extend from the front end to the rear end of the floor conveyor. Slide surfaces on the base and the wings support floor slats.

11 Claims, 6 Drawing Sheets

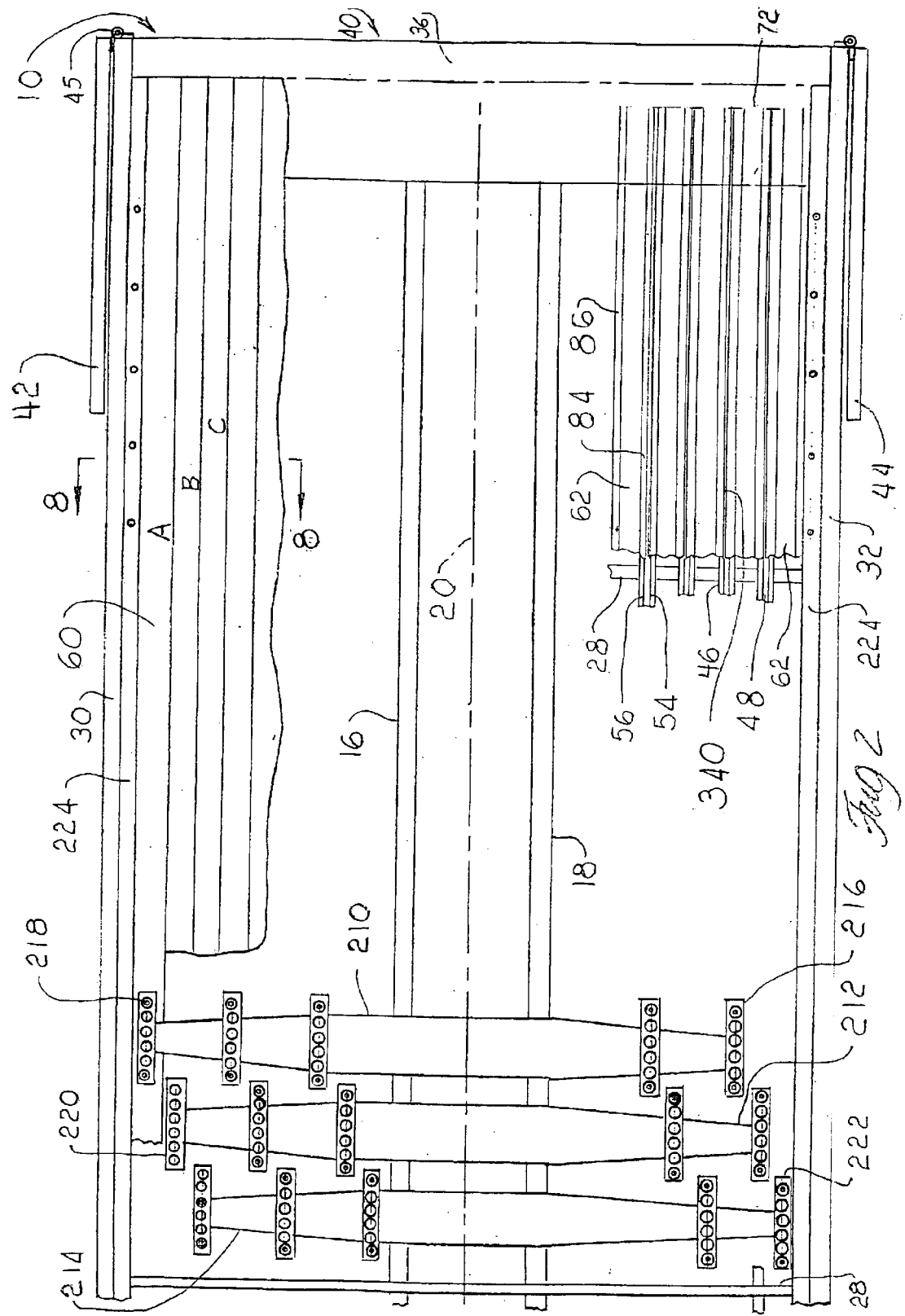

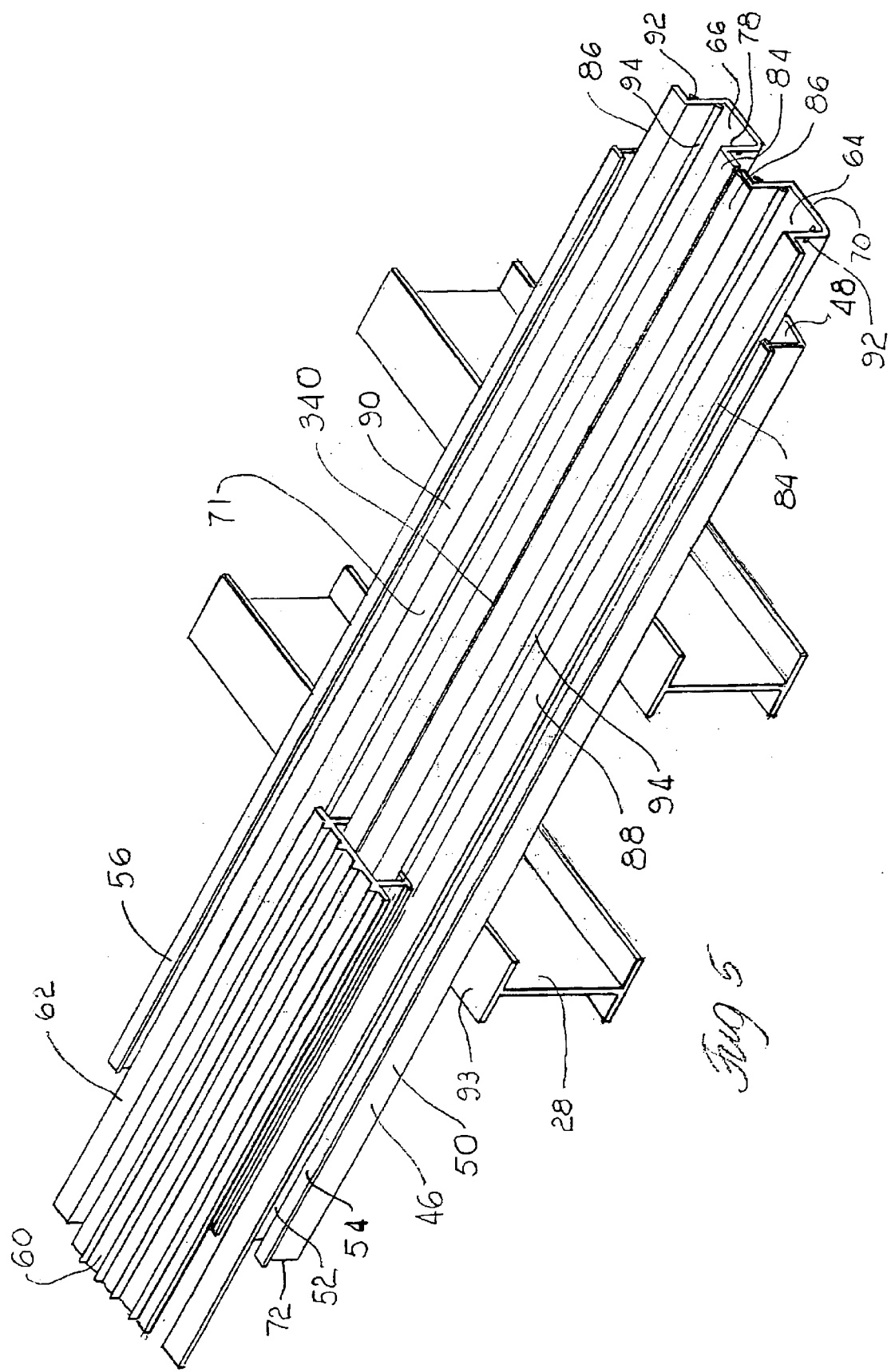

RECIPROCATING FLOOR CONVEYOR

TECHNICAL FIELD

This invention relates to reciprocating floor conveyors and more particularly to floor conveyors with seals between the floor slats and slide bearings extending the length of the floor.

BACKGROUND OF THE INVENTION

Reciprocating floor conveyors have been used for several years in van bodies and in trailers for unloading cargo. These conveyor systems are widely used for transporting bulk material such as ground plant material for animal feed, saw dust, wood chips, bark and plant material for human consumption. The conveyor systems include a plurality of parallel floor slats each of which extends substantially the length of the van body or trailer on which it is mounted. Each floor slat is supported by two slide bearings that permit it to slide back and forth in a direction parallel to its long axis.

Several different drives and drive systems have been employed in reciprocating floor conveyors to reciprocate the floor slats back and forth. A commonly used drive system includes three hydraulic cylinders that move all the slats simultaneously to the rear toward a rear discharge charge carrying cargo with them. The first cylinder is connected to and drives every third floor slat. The second cylinder is connected to and drives all the floor slats that are adjacent to a common side of the floor slats attached to the first cylinder. A third cylinder is connected to and drives the floor slats that are each between a floor slat driven by the first cylinder and a floor slat driven by the second cylinder. The first, second and third cylinders are activated one at a time to move every third floor slat forward and away from the rear discharge without moving cargo forward. The floor slats do not convey cargo when two thirds of the floor slats are stationary while one cylinder moves one third of the slats forward. The third cylinder moves the floor slats connected to it forward while the floor slats connected to the first and second cylinders remain stationary. The second cylinder then moves the floor slats connected to it forward while the floor slats connected to the first and third cylinders remain stationary. The first cylinder then moves the floor slats connected to the first cylinder forward while the floor slats connected to the second and third cylinders remain stationary. The above procedure is then repeated to move the cargo through the rear discharge opening. The procedure continues to be repeated until all the cargo is discharged.

Floor slats are commonly made form aluminum or other suitable material. Space is provided between aluminum floor slats to accommodate thermal expansion of the floor slats and to prevent galling. Galling can occur when aluminum floor slats are moving relative to each other and in contact with each other. The space between adjacent floor slats in reciprocating floor conveyors create two problems. One problem is the loss of cargo. This is not a serious problem if the cargo is non-toxic and inexpensive. Loss of cargo is a serious problem, however, if the cargo is a toxic material or if the cargo is expensive. The second problem is cargo contamination. Cargo can be contaminated by water and other material on a road surface that is thrown outwardly by vehicle wheels and passes through spaces between the floor slats. Cargo contamination is an extremely serious problem if the cargo is for human or animal consumption.

Two basic types of solutions to the problem caused by the space between floor slats have been tried. One solution is to place a fixed sub-floor under the floor slats to catch the material that passes between the floor slats and to prevent outside contaminates from contacting the floor slats. This solution adds weight and expense to reciprocating floor conveyor systems. Catching material that passes down between the slats also adds disposal problems if it is necessary to dispose of the material that is caught. Seals between the floor slats have been the preferred solution to the problem. Seals between the floor slats can virtually eliminate cargo loss as well as cargo contamination. Seals between reciprocating floor slats are generally resilient and rely upon their resilience to maintain sealing contact. Seals that can be inflated have also been tried. Inflated seals are deflated during conveying operations.

Some seals that are currently in use are carried by one floor slat and are in sliding contact with a vertical or near vertical surface on the side of the adjacent floor slat. These seals are made from the materials that have a low coefficient of friction, that are tough, and that are resilient. The low coefficient of friction is required to minimize the force required to reciprocate the floor slats back and forth and to prolong seal life. The seals must be made of tough material to prolong seal life and to prevent the penetration of cargo. Resiliency is required to accommodate variations and the size of the gap between floor slats and to maintain sealing contact between the seals and sliding contact surfaces on adjacent floor slats. During use, seals wear and their ability to seal decreases.

The floor slats slide fore and aft on bearings that support and guide each floor slat. These bearings allow limited lateral movement of the floor slat. Cargo may therefore move the floor slats laterally. If the reciprocating floor is slightly lower on one side than on the other side, the cargo will tend to move the floor slats toward the low side. This results in a decrease in a gap between some floor slats and an increase in the gap between other floor slats. The seals that slide on a vertical or near vertical surface must have the ability to accommodate the changes in the gap between adjacent floor slats. Seals that have been used in the past can accommodate only small changes in the size of the gap between adjacent floor slats.

Some seals that are currently in use are compressed when the gap between adjacent floor slats decrease. With a few seal designs a portion of the seal can become pinched between the surfaces on adjacent floor slats. This pinching increases the load between the seals and the floor slat surface. The increased load due to seal compression or due to pinching the seal increases the power required to reciprocate the floor slats and increases wear.

Cold temperatures tend to stiffen resilient seals. It has been found that some seals that are stiffened by low temperature can wear through the side of a floor slat thereby destroying the floor slat in a relatively short period of time.

Abrasive cargo increases the wear between floor slats and seals that are in sliding contact with each other. Some parts of floor slats cannot accommodate much wear without the floor slat being essentially destroyed.

Some floor slat seal designs, that are currently in use, create a pocket which catches and retains solids and liquids that pass through the space between the upper portions of adjacent floor slats. In cold weather the liquid and solids freeze. The frozen liquids and solids may exert large forces on seals due to the expansion of the liquid as it turns to ice. The excess force on the seals increases the force required to reciprocate the floor slats and increases wear on the seals and seal contact surfaces. The solids held by the frozen liquids also increase wear on the floor slats and the seals if the solids are abrasive.

SUMMARY OF THE INVENTION

Each floor slat, of a plurality of side by side parallel floor slats for a reciprocating floor conveyor, has a front end, a rear end, and a top section. The top section includes a generally horizontal top surface, a first side and a second side. A first side wall integral with the first side of the top section, extends downward from the top section, and extends from the front end to the rear end of the floor slat. A second side wall, integral with the top section, parallel to and spaced from the first side wall, extends downward from the top section, and extends from the front end to the rear end of the floor slat. A first bottom flange integral with the first side wall, extends laterally toward the second side wall, extends from the front end to the rear end, and is vertically spaced from the top section. A second bottom flange is integral with second side wall, extends laterally inward toward the first side wall, extends from the front end to the rear end, and is vertically spaced from the top section. A top section cantilevered portion is integral with the top section, extends laterally outward from the second side wall and extends from the front end to the rear end.

A seal flange integral with the first side wall includes a flat horizontal seal support surface. A vertical wall, integral with a seal flange, cooperates with an outboard side of the first side wall to form a seal retainer channel that is outboard of the outboard side of the first side wall. The seal retainer channel has an open channel top and extends from the front end and to the rear end of the floor slat. The top section cantilevered portion of each floor slat is vertically spaced above an adjacent floor slat seal retainer channel.

A combination seal and bearing is mounted in the seal retainer channel. An upwardly facing bearing surface of the combination seal and bearing is engagable with a seal contact surface on a cantilevered portion bottom.

A reciprocating floor conveyor slide bearing includes a horizontal center base with a base front end at the front end of the floor, a base left side, a base right side, a cross beam engaging bottom surface, a first floor slat top bearing surface, and a second floor slat top bearing surface. A left side wall is integral with the base left side and extends upward from the horizontal base and from the base front end to the base rear end. A right side wall is integral with a base right side and extends upwardly from the horizontal base and from the base front end to the base rear end. A left wing is integral with a left side top of the left side wall and extends to the left of the left side wall. The left wing has a guide beam engaging left wing bottom surface and left wing top bearing surface. A right wing is integral with a right side top of the right side wall and extends to the right of the right side wall. The right wing has a guide beam engaging right wing bottom surface and right wing top bearing surface. The length of each slide bearing permits the bearing to extend from the front of the floor to the rear of the floor at the maximum operating temperature. The slide bearings are free to contract as temperature decreases.

The slide bearing are an extruded or a molded one piece structure. An ultra high molecular weight plastic material is preferred for extruding or molding the slide bearings.

BRIEF DESCRIPTION OF THE DRAWINGS

Reference now is made to the accompanying drawings in which:

FIG. 2 is an enlarged top plan view of a portion of the reciprocating floor conveyor and semi trailer with some parts removed and other parts broken away to show the construction;

FIG. 5 is an enlarged perspective view of a portion of the floor with parts broken away;

DESCRIPTION OF THE PREFERRED EMBODIMENT

Figure 1:
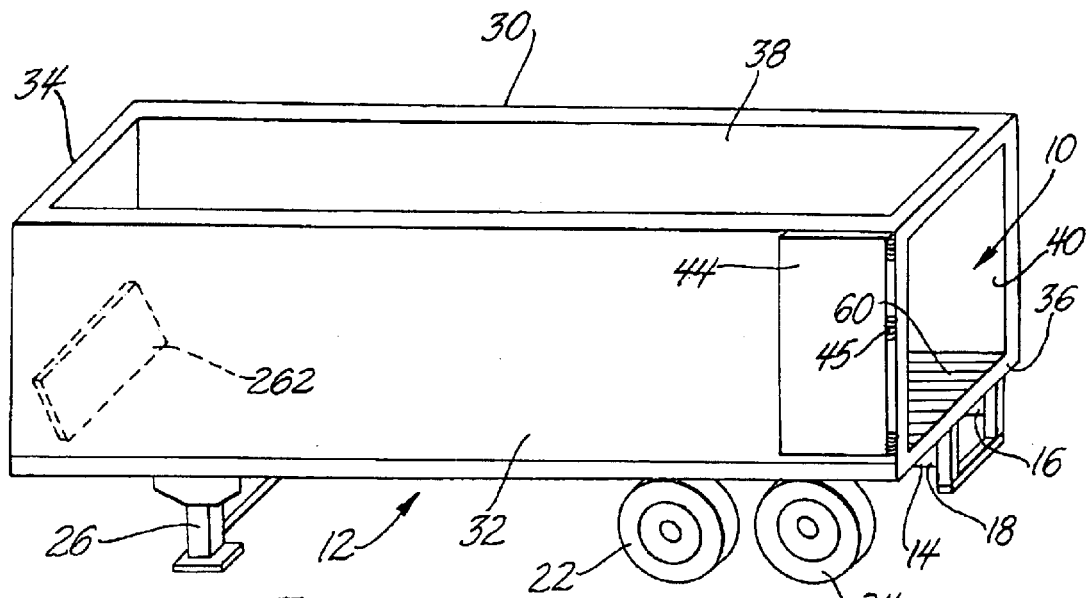
FIG. 1 is a perspective view of a semi trailer employing a reciprocating floor conveyor for unloading cargo.

The reciprocating floor conveyor 10 is shown in the drawing as part of a semi trailer 12. The reciprocating floor conveyor 10 could also be part of a van body mounted on a truck chassis. The floor conveyor 10 may also be part of a stationary conveying system. The semi trailer 12 as shown in FIG. 1 has a main frame 14 which includes a pair of spaced apart channel members 16 and 18 that are parallel to a center axis 20 running the length of the semi trailer. The rear portion of the semi trailer 12 is supported by wheels and tires 22 and 24 that are rotatably journaled on conventional axles. The axles are attached to the main frame 14 by a suspension system. A portion of the semi trailer 12 is supported by a vertically adjustable landing gear 26. A hitch pin (not shown) for attaching the semi trailer 12 to a fifth wheel on a tractor is attached to the bottom by the main frame 14 on the center line 20 of the semi trailer 12 forward of the landing gear 26. Channel members 16 and 18 end at a point to the rear of the hitch pin and are indirectly attached to the hitch pin to keep the height of the reciprocating floor 10 at the front of the semi trailer 12 at the same height as the reciprocating floor conveyor at the rear of the semi trailer.

A plurality of cross beams 28, that are transverse to the center line 20, are attached to the main frame 14. The cross beams 28, as shown, are I-beams. These cross beams 28 can be aluminum or steel. The spacing of a cross beam 28 depends on the intended use and the cargo the reciprocating floor conveyor 10 supports. The cross beams 28 have been placed on 12 inch centers in some semi trailers 12. In other semi trailers 12 the center lines of the cross beams 28 have been as much as fifteen inches apart.

The right side wall 30 is attached to the right hand ends of the cross beams 28. A left side wall 32 is attached to the left hand ends of the cross beams 28. A front end wall 34 is attached to the right side wall 30 and the left side wall 32 and to the front portion of the main frame 14. The top and bottom of the right side wall 30, the left side wall 32 and the front end wall 34 are reinforced to provide structural integrity. A pair of cross beam 36 and 37 are connected to the right side wall 30 and the left side wall 32 at the rear of the semi trailer 12 to reinforce the cargo container 38 and to define a rear discharge opening 40 that is substantially the same height and width as the cargo container 38. Doors 42 and 44 for closing the discharge opening 40 are attached to the right side wall 30 and the left side wall 32 by hinges 45. The top of the semi trailer 12 is open for depositing cargo in the cargo container 38.

A plurality of guide beams 46, that are parallel center line 20, are attached to the tops of the cross beams 28. The attachment of the guide beams 46 to the cross beams 28 may be by mechanical fasteners or by welding. The guide beams 46 are a U-shaped channel that extends substantially the entire length of the semi trailer 12. These U-shaped channels 46 have a horizontal base 48 and vertical sides 50 and 52. A horizontal top plate 54 is integral with top of the vertical side 50. A horizontal top support plate 56 is integral with the top of the vertical side 52. The guide beams 46 have an end that is adjacent to the front end wall 34 and an end that is adjacent to the doors 42 and 44 when the doors are closing the rear discharge opening 40. There is a section removed from each guide beam 46 in the center portion of the semi trailer 12 to provide space for the floor slat drive assembly 58. The guide beams 46 are on centers that are spaced apart a distance that is slightly more than the width of the floor slats 60. If the width of the floor slats 60 is 3.610 inches, center lines of the guide beams 46 may for example, be 3.650 inches apart. This provides a nominal gap of four hundredths of an inch which is generally satisfactorily when using floor slats made from aluminum. If the floor slats 60 are made from material such resins that can function as low friction bearing surfaces, it may not be necessary to provide a nominal gap between adjacent floor slats to prevent sliding contact between adjacent floor slats. However, it may be necessary to provide for thermal expansion. The number of guide beams 46 required depends on the inside width of the cargo container 38 and the width of the floor slats 60. In some reciprocating floor conveyors ten to twenty-four or more guide beams 46 are required. Reciprocating floor conveyors 10 with wide floor slats 60 have been used which employ two space guide beams 46 for each floor slat.

The full length slide bearings 62 are made from an ultra high molecular weight (UHMW) plastic that has a low coefficient of friction, high wear resistance and high strength. Each side bearing 62 has a base 64 with an upper surface 66, a lower surface 68, a front end 70, a rear end 72, and left side 74 and a right side 76. A left side wall 78 is integral with the left side 74 of the base 64, extends upward from the base and extends from the front end 70 to the rear end 72. A right side wall 71 is integral with the right side 76 of the base 64, extends upward from the base and extends from the front end 70 to the rear end 72. A left wing 84 is integral with the left side wall 78. A right wing 86 is integral with the right side wall 71. The left wing 84 extends laterally outward to the left from the top of the left side wall 78 and from the front end 70 to the rear end 72. The right wing 86 extends laterally outward to the right from the top of the right side wall 71 and from the front end to the rear end 72. The left wing 84 has a left guide beam engaging surface 85 that faces downward and a left wing bearing surface 88 that faces upward. The right wing 86 has a right guide beam engaging surface 89 that faces downward and a right wing bearing surface 90 that faces upward.

The lower surface 68 of the base 64 sits on an upper surface 93 of cross beams 28 between two adjacent guide beams 46. The left guide beam engaging surface 85 sits on a first guide beam 46. The right guide beam engaging surface 89 sits on a second guide beam 46. When a slide bearing 62 is in place and in engagement with two guide beams 46 and the cross beams 28, the space between two adjacent guide beams is closed. Cargo loss and cargo contamination are prevented.

A left upper finger 92 extends laterally outward from the left side wall 78 and forms a left slot 95 between the left upper finger 92 and the guide beam engaging surface 85. The left slot 95 extends from the front end 70 to the rear end 72 of the slide bearing 62. A right upper finger 92 extends laterally outward from the right side wall 71 and forms a right slot 99 between the right upper finger 92 and the guide beam engaging surface 89. The right slot 99 extends from the front end 70 to the rear end 72 of the slide bearing 62. A left lower finger 94 extends laterally inward from the left 78 and forms a left lower slot 103 between the lower finger 94 and the upper surface 66 at the base 64. The left lower slot 103 extends from the front end 70 to the rear end 72 of the slide bearing 62. A right lower finger 94 extends laterally inward from the right side wall 71 and forms a right lower slot 107 between the right lower finger 94 and the upper surface 66 of the base 64. The right lower slot 107 extends from the front end 70 to the rear end 72 of the slide bearing 62.

The slide bearings 62, as described above, is preferably an extruded member. However, the slide bearing 62 could be molded or even fabricated from separate pieces. During installation of the slide bearing 62, the base 64 and the left and right side walls 78 and 71 are inserted into the space between two adjacent guide beams 46. A downward force is exerted on the slide bearing 62 until the lower surface 68 of the base 64 contacts the cross beams 28, the horizontal top support plates 54 snap into the slot 99, and the top support plates 56 snap into the slot 95. The plates 54 and 56 cooperate with the upper fingers 92 to limit upward movement of each slide bearing 62 away from the cross beams 28.

The slide bearings 62 extend from the front end wall 34 to the rear discharge opening 40. It is necessary to provide adequate space for thermal expansion of the slide bearings 62. If desired mechanical fasteners can also be added to anchor and each slide bearing 62 to one cross beam 28. However, the front wall 34 and the cross beam 36 can adequately contain the slide bearings 62.

Figure 6:
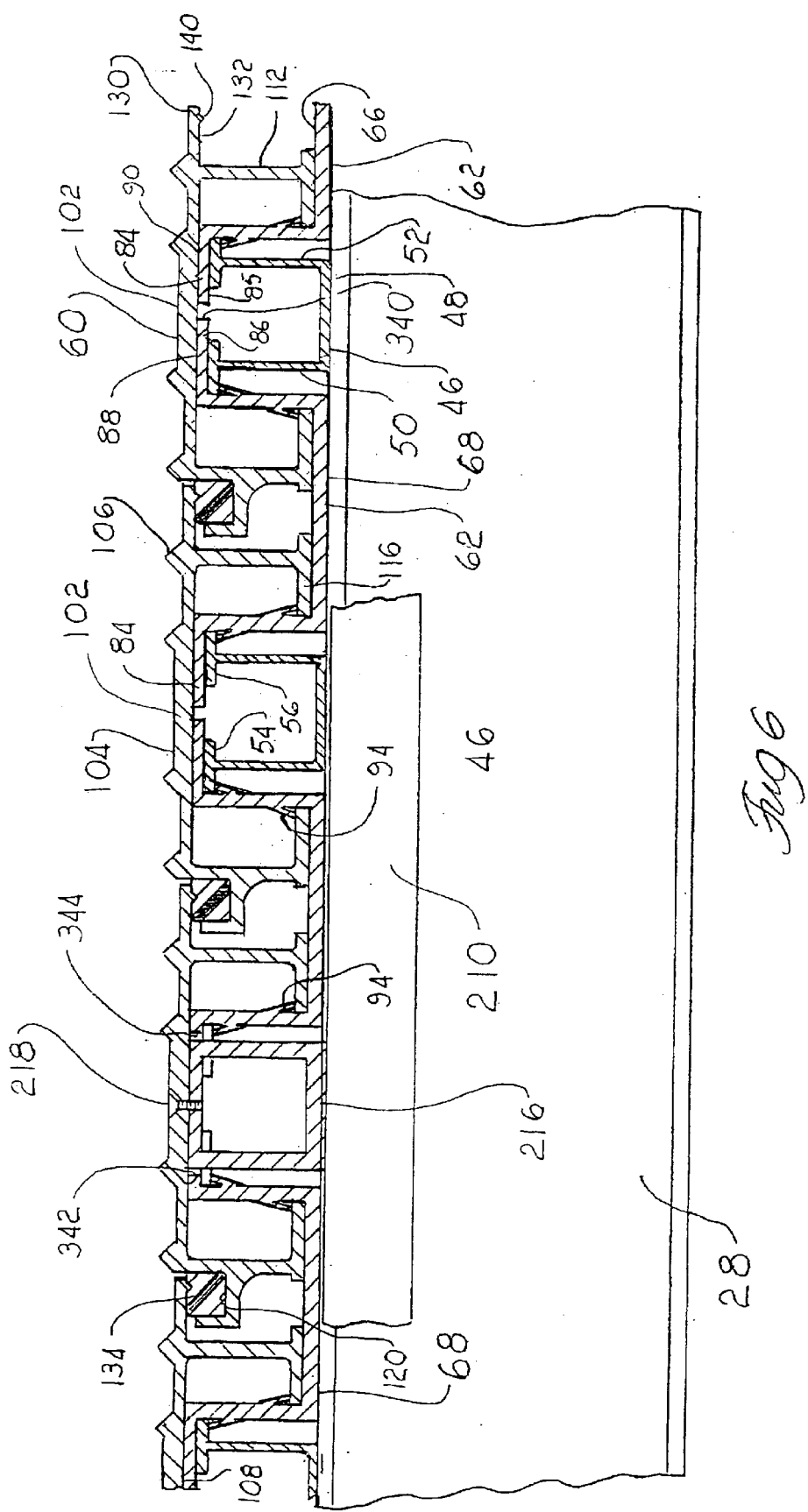
FIG. 6 is an enlarged sectional view similar to FIG. 8 showing a transverse drive beam, a floor slat connector and slide bearings.
Figure 8:
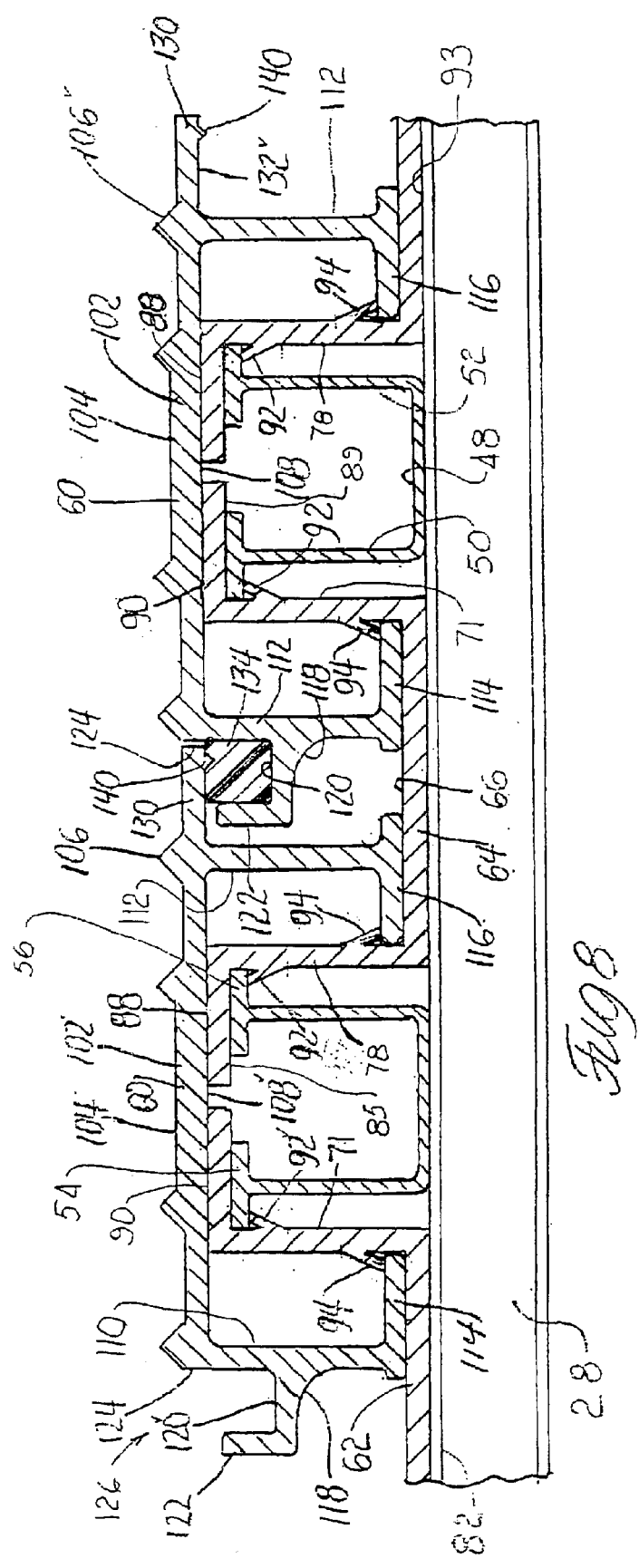
FIG. 8 is an enlarged sectional view taken along line 8—8 in FIG. 2.

The floor slats 60, as shown in FIGS. 1, 6 and 8 can be made from metals or from resins. Aluminum floor slats 60 are employed in many floor conveyors 10. Resins are used to make floor slats for conveying caustic materials as well as other materials. Floor slats made from resins can be reinforced by fibers such as glass, carbon and fiber cloth layers of unidirectional fiber net material sold under the trademark KELVAR® owned by New England Ropes, Inc. Resin floor slats may be formed by extrusion processes. If a resin with fiber reinforcement is used, a modified extrusion process referred to as pultrusion is used to move the fibers and resin through a forming dye. Aluminum floor slats 60 are generally made by an extrusion process. Floor slats 60 can also be formed by casting and other manufacturing processes.

Each floor slat 60 includes a top section 102 with a generally horizontal top surface 104. Ribs 106 can be added to the top surface 104 to strength the floor slat 60 if desired. The thickness of top section 102 can be increased in some areas to increase floor slat strength. A bottom surface 108 of the top section 102 is a slide bearing contact surface. A generally vertical first wall 110 extends downward from a first side of a top section 102. The first side wall 110 also extends substantially the length of the top section 102 in most reciprocating floor conveyors 10. A generally vertical second side wall 112 extends downward from the second side of the top section 102. The second side wall 112 also extends substantially the length of the top section 102. The top section 102 and the first and second side wall 110 and 112 form a channel shape member.

A first bottom flange 114 of a floor slat 60 is integral with the bottom of the first side wall 110 and extends horizontally inward toward the second side wall 112. A second bottom flange 116 is integral with the second side wall 112 and extends horizontally inward toward the first side wall 110.

A seal flange 118 is integral with the first side wall 110, extends laterally outward from the side wall, and has a generally horizontal seal support surface 120 that faces upwardly and is spaced below the top section 102. The first seal flange 118 also has a generally vertical wall 122 that extends upward from a support surface 120 and is spaced from an outboard side 124 of the first side wall 110. The seal flange 118 also extends substantially the length of the first side wall 110. The outboard side 124 of the side wall 110, the horizontal seal support surface 120 and the vertical wall 122 form a seal retainer channel 126 with an open top.

The top section 102 of the floor slat 60 includes a top section cantilevered portions 130 that extends laterally outward past the second side wall 112 and has a downwardly facing generally horizontal seal contact surface 132. This portion 130 of the top section 102, with a second seal contact surface 132 supports cargo. The cargo supported by this portion 130 exerts some force on the second side of the floor slat 60 that tends to rotate the slat about the slat long axis. When two floor slats 60 are mounted in a floor conveyor 10 adjacent to each other, the first seal support surface 120 is directly below the second seal contact surface 132 and is spaced from second seal contact surface. A combination seal and bearing 134 has a rectangular cross section and extends substantially the entire length of the floor slats 60. The seal retainer channel 126 receives the combination seal and bearing 134. A snug fit between the seal and bearing 134 and the channel 126 limits movement of the seal relative to the channel. The seal 134 is preferably made from an ultra high molecular weight (UHMW) plastic or similar material. This plastic material is flexible, tough and has a low coefficient of friction. UHMW plastic expands when the temperature increases and contracts when the temperature decreases. To accommodate length changes in the seal 134, the seal must be free to float in the channel 126 in a direction parallel to the long axis 20 of the floor slats 60. Seal contraction and expansion is accommodated by an anchor (not shown). The anchor can a threaded member that screws into a threaded bolt passage through the vertical wall 122 and extends into the seal 134 in one location between the ends of the seal. The anchor fixes the seal 134 in one place relative to the channel 126 and leaves the ends of the seal to move toward or away from the anchor due to temperature changes. Seal expansion can also be accommodated by end stops at both ends if the highest temperature of the seal 134 is known. When the highest temperature is known, the seal 134 can be cut with a selected length that does not exceed the distance between the end stops at maximum seal temperature. The threaded anchor can be replaced by a non-threaded fastener.

A downward extending V-shaped projection 140 from the second seal contact surface 132 on the cantilevered portion 130 of a floor slat 60 contacts the seal 134 and forms a groove 142 in an upper surface of the seal. This projection 140, extending the length of the floor slat 60, cooperates with the groove 142 formed in the seal 134 to form a seal that limits loss of cargo and reduces contamination. The groove 142 is formed in the seal 134 by the operation of the floor slat 10 when supporting cargo.

Cargo on the floor slat 60 rest on the top surface 104 of the top section 102. A portion of the load on the top surface 104 is transferred through bottom surface 108 of the top section 102, to bearing surfaces 88 and 90 on two adjacent slide bearings 62, to top support plates 54 and 56 on the guide beam 46 and to cross beams 28. The top support plates 54 and 56 are wider than the base 48 of the guide beams 46 and resists any rotation of the floor slats 60 about the long axis of the supported floor slats 60.

A portion of the load on the top surface 104 of a top section 102 of a floor slat 60 is transmitted through the side walls 110 and 112 to the bottom flanges 114 and 116 and through the base 64 of two slide bearings 62 to a cross beam 28. The side flanges 114 and 116 are spaced apart to further resist rotation of a floor slat 60 about a floor slat long axis.

A portion of the load on the top surface 104 of a floor slat 60 is supported by the cantilevered portion 130 of the top section 102. The load on the cantilevered portion 130 is transferred through the seal and bearing 134 to the seal support surface 120 in the seal retainer channel 126 on an adjacent floor slat 60. The load on the adjacent floor slat 60 is transferred to the first bottom flange 114 through the base 64 of a slide bearing 62 and to a cross beam 28. The seal 134 is a load support member and functions as a bearing to permit sliding of one floor slat 60 relative to an adjacent floor slat. The seal 134 is a combination bearing and seal as explained above. Each floor slat 60 is slideably supported at five separate areas across the width of the slat. The width of support plates 54 and 56 and bottom flanges 114 and 116 are nearly 80% of the width of the floor slats 60. With a large support area and larger bearing surfaces, the load per unit area is decreased. Decreasing the load per unit area decreases wear and extends the life of the floor conveyor 10. The support is provided by the slide bearing 62 and each cross beam 28 along the length of each floor slat 60. Cargo placed on the floor conveyor 10 increases the resistance to leakage. This increased load on the seal 134 also increases the force required to reciprocate the floor slat 60 due to the floor seal 134. The increase in the force required to reciprocate the floor slat 60 is minimal however, due to the low coefficient of friction of the material employed to make the floor seal 134.

The floor slats 60 are slightly shorter than the semi trailer 12 or other cargo container 38 to prevent damage to floor slats if they are reciprocated back and forth while the discharge opening 40 is closed. The forward ends of the floor slats 60 are under a slant board 262 while conveying cargo. The slant board 262 prevents cargo from entering the space between the forward ends of the floor slats 60 and the front end wall 34. The floor slats 60 in some semi trailers 12 can be over fifty feet long. These floor slats 60 preferably have the same cross sectional shape over their entire length.

During construction of the floor conveyor 10, a plurality of guide beams 46 are secured to the cross beams 28. Mechanical fasteners are generally used to facilitate replacement of damaged guide beams 46. The guide beams 46 extend the length of the cargo container 38 except for the area where the floor slats 60 are attached to drive beams 210, 212 and 214 of a floor slat drive assembly 58.

Slide bearing 62 are pressed into position between each pair of adjacent guide beams 46 and into engagement with the cross beams 28. Upper fingers 92 on the slide bearing 62 snap into position underneath the top support plates 54 and 56 to hold the slide bearings in place. Other fasteners are not required. Floor slats 60 are then placed over each guide beam 46 and straddle adjacent sides of two slide bearings 62. A vertical downward force on each floor slat 60 forces the bottom flanges 114 and 116 to snap into position under the lower fingers 94.

A number of floor slats 60 with designs that are somewhat different than the floor slats described above can be used with the slide bearings 62. The floor slats 60 described above can also be used with slide bearings that are somewhat different than the slide bearings 62.

The floor slat drive assembly 58 includes transverse drive beams 210, 212 and 214. The transverse drive beam 210 has a plurality of spaced apart floor slat connectors 216 that are connected to each A floor slat 60 by bolts 218. The transverse drive beam 212 has a plurality of spaced apart floor slat connectors 220 which are connected to each B floor slat 60 by bolts 218. The B floor slats 60, as shown in FIG. 2, are on the left hand side of each A floor slat as seen when looking toward the front end wall 34 from the discharge opening 40. The transverse beam 214 has a plurality of spaced apart floor slat connectors 222 which are connected to each C floor slat 60 by bolts 218. The C floor slats 60 are positioned between each A floor slat and B floor slat. At the right and left edges of the reciprocating floor conveyor 10 adjacent to the right side of the wall 30 and the left side wall 32 is a non-reciprocating half floor slat 224. The half floor slat 224 has been cut through the horizontal top section 102 along its entire length. The left half of the half floor slat 224 is bolted to cross beams 28 adjacent to the right side wall 30 with an integral left side wall 110 to the left. The right half floor slat 224 is bolted to the cross beams 28 adjacent to the left side wall 32 with its integral side wall 112 to the right. The two half slats 224 can be adjusted horizontally toward and away from the centerline 20 of the trailer 12 to set the gap between the adjacent floor slats 60. The horizontal adjustment of the half floor slats 224 toward and away from the centerline 20 can be made at the time of assembly or slots can be provided for the bolts that secure the half floor slats to the cross beams 28 to facilitate field adjustment. The floor slats 60 can float laterally within limits on the slide bearings 62 toward and away from the centerline 20.

Figure 3:
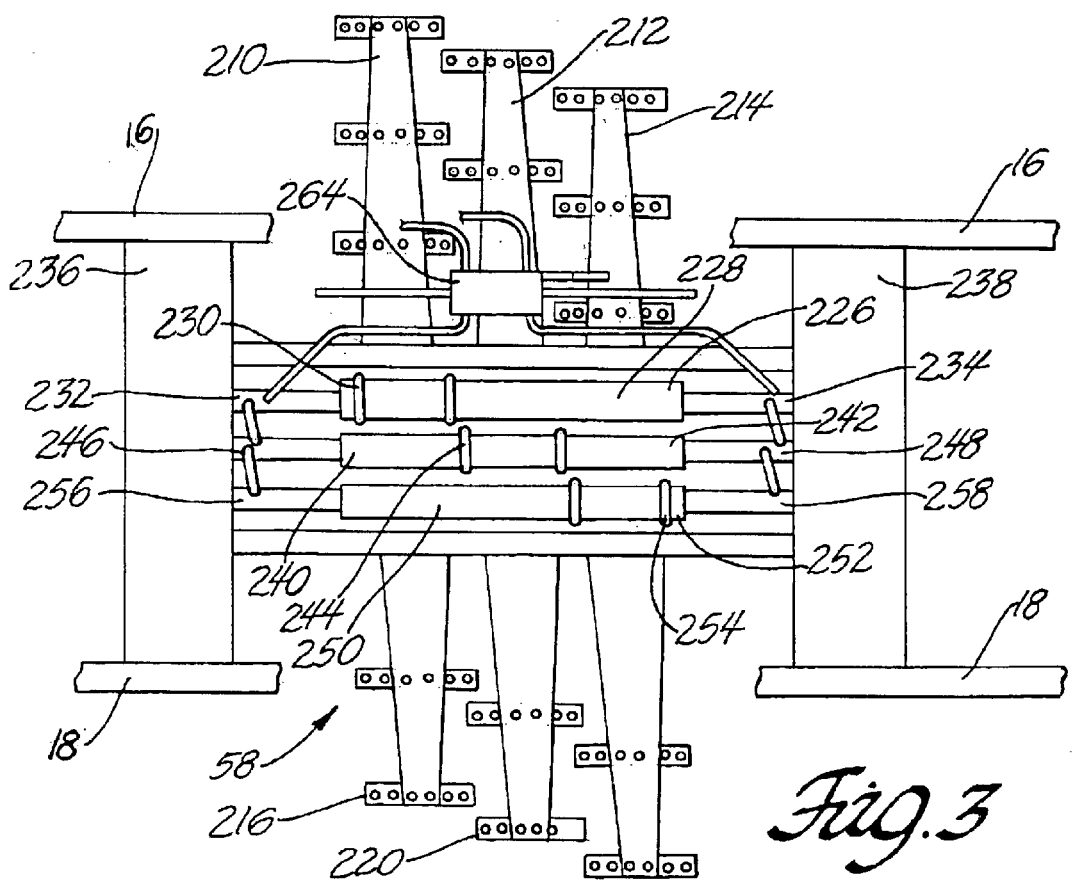
FIG. 3 is a bottom plan view of the floor slat drive assembly with parts broken away.

The transverse drive beam 210, as shown in FIG. 3, is clamped to the cylindrical barrel 226 of hydraulic cylinder 228 by U-clamps 230. The hydraulic cylinder 228 has two piston rods 232 and 234 which are fixed to cross beams 236 and 238 that are secured to the spaced apart channel members 16 and 18 forward of the wheels and tires 22 and 24 and to the rear of the landing gear 26 and the hitch pin for attaching the semi trailer 12 to a fifth wheel. Hydraulic fluid under pressure is applied to the hydraulic cylinder assemblies 228 to move the A floor slats 60 back and forth. The transverse drive beam 212 is clamped to the cylindrical barrel 240 of the hydraulic cylinder assembly 242 by U-clamps 244. The hydraulic cylinder assembly 242 has two piston rods 246 and 248 which are fixed to cross beams 236 and 238. Hydraulic fluid under pressure applied to the hydraulic cylinder assembly 42 to move the B floor slats 60 back and forth. The transverse drive beam 214 is clamped to the cylindrical barrel 250 of a hydraulic cylinder assembly 252 by U-clamps 254. Hydraulic cylinder assembly 252 has two piston rods 256 and 258 which are fixed to cross beams 236 and 238. Hydraulic fluid under pressure is supplied to the hydraulic cylinder assembly 252 to move the C floor slats 60 back and forth.

Figure 4:
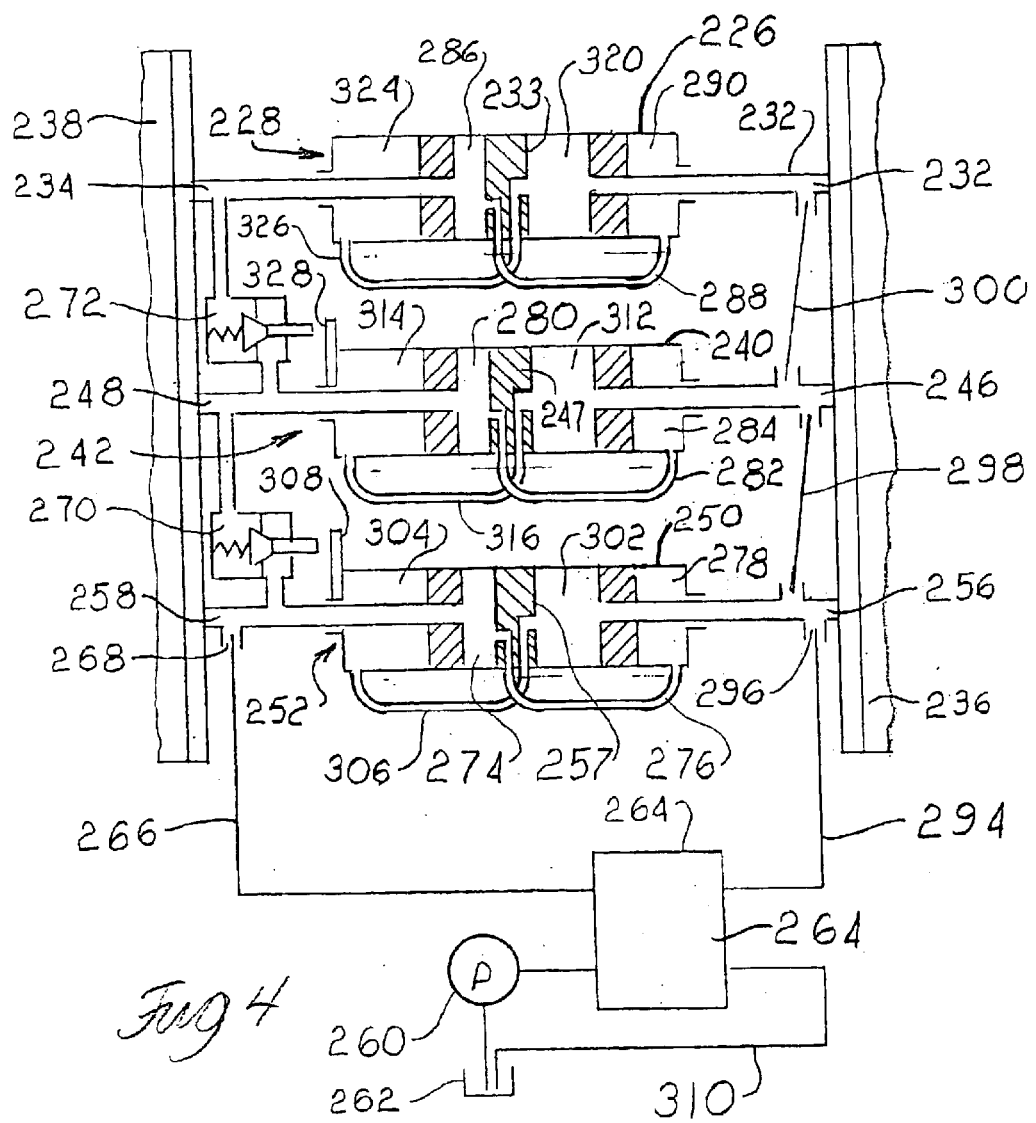
FIG. 4 is a hydraulic system schematic.
Figure 7:
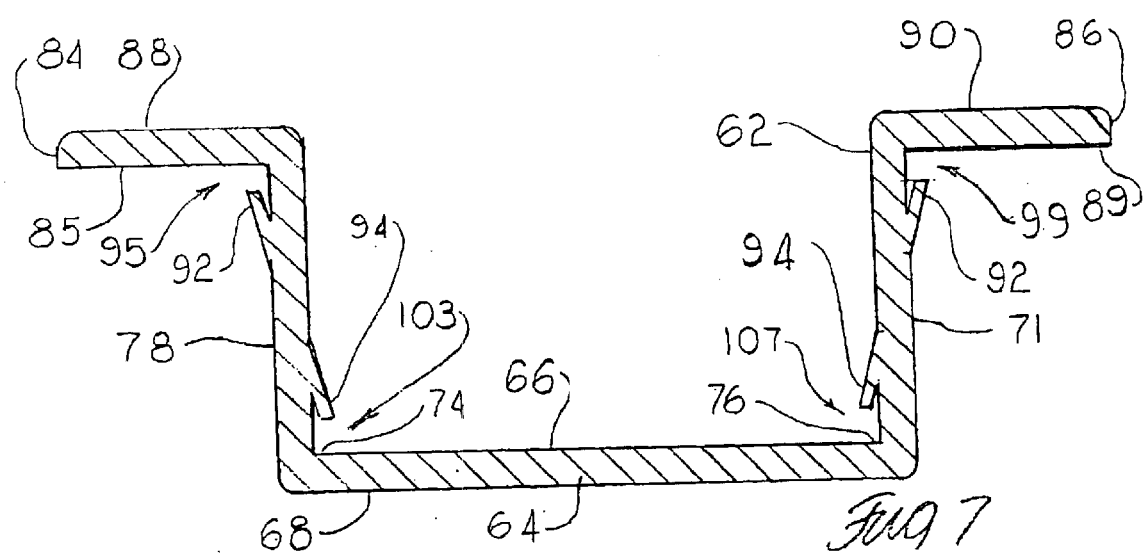
FIG. 7 is an enlarged end elevational view of a floor slat bearing.

Hydraulic fluid is supplied to the hydraulic cylinder assemblies 228, 242 and 252 by hydraulic pump 260 shown schematically in FIG. 4. The hydraulic pump 260 draws hydraulic fluid from a sump 262 and supplies the hydraulic fluid to a switching valve 264. The switching valve 264 supplies hydraulic fluid from the hydraulic pump 260 to a port 268 through a conduit 266. Pressure of hydraulic fluid at the port 268 opens valves 270 and 272 so that hydraulic fluid under pressure is supplied simultaneously to the hydraulic cylinder assemblies 228, 242 and 252 to move all of floor slats 60 rearward together. Hydraulic fluid supplied to a hydraulic cylinder assembly 252 through piston rod 258 flows into a chamber 274 and through a passage 276 to a chamber 278 and moves the cylindrical barrel 250 to the rear toward the crossbeam 236. Hydraulic fluid under pressure from the port 268 passes through the open valve 270 and through the piston rod 248 of the hydraulic cylinder assembly 242. Hydraulic fluid supplied to the hydraulic cylinder assembly 242 through the piston rod 248 flows into a chamber 280 and through a passage 282 to a chamber 284 and moves the cylindrical barrel 240 to the rear toward the cross beam 236. A portion of the hydraulic fluid under pressure from the port 268 that passes through the open valve 270 also passes through the open valve 272 and to the piston rod 234 of the hydraulic cylinder assembly 228. Hydraulic fluid supplied to the hydraulic cylinder assembly 228 through the piston rod 234 flows into a chamber 286 and through a passage 288 to a chamber 290 and moves the cylindrical barrel 226 to the read toward the crossbeam 236. The pistons on the ends of the piston rods 232, 234, 246, 248, 256 and 258 are fixed to the piston rods and the crossbeams 236 and 238 and do not move. The cylinder dividing walls 233, 247 and 257 are fixed to the cylindrical barrels 226, 240 and 250 and move with the cylindrical barrels. The switch valve 264 is connected to the transverse drive beam 210 and reverses the flow of hydraulic fluid to the hydraulic pump 260 when the valve rod 292 shown in FIG. 3 strikes the crossbeam 236

The delivery of hydraulic fluid under pressure from the hydraulic pump 260 through the conduit 294 and the port 296 supplies hydraulic fluid to the piston rod 256, to the piston rod 246 through the conduit 298, and to the piston rod 232 through the conduit 300. The piston rod 256 supplies hydraulic fluid to the chamber 302 and to chamber 304 through conduit 306. This moves the cylindrical barrel 250 of the hydraulic cylinder assembly 252 forward toward the crossbeam 238. The hydraulic cylinder assemblies 242 and 228 remain stationary because the valves 270 and 272 are closed and fluid is locked in the chambers 280, 284, 286, and 290. When the cylinder 250 approaches the forward end of its movement, a projection 308 on the cylindrical barrel 250 opens the valve 270. Opening the valve 270 allows fluid to return to the sump 262 from the chambers 280 and 284 and that allows hydraulic fluid under pressure supplied to the piston rod 246 to enter chamber 312 and the chamber 314 through the conduit 316 and forces the cylindrical barrel 240 to move forward. When the cylindrical barrel 240 of hydraulic cylinder assembly 242 approaches the forward end of its movement, a projection 328 on the cylindrical barrel 240 opens the valve 272. Opening the valve 272 allows fluid to return to the sump 262 from chambers 286 and 290, and that allows hydraulic fluid under pressure supplied to the piston rod 232 to enter chamber 320 and the chamber 324 through a conduit 326 and forces the cylindrical barrel 226 to more forward toward the crossbeam 238. When the cylindrical barrel 226 of the hydraulic cylinder assembly 228 reaches the forward end of its travel, switching valve rod 292 contacts the crossbeam 238 and reverses the flow of hydraulic fluid from the hydraulic pump 260 and connects the port 296 and the conduit 294 to the conduit 310 and the sump 262. When port 296 is connected to the sump 262, the chambers 302, 304, 312, 314, 320 and 324 are also connected to the sump 362. The floor slat drive assembly 58 then repeats the cycle.

The hydraulic system, shown schematically is FIG. 4, is one of several systems that are available and that have been used in reciprocating floor conveyors 10. There are other systems for reciprocating floor slats that will work. For example, it is possible to drive two groups of floor slats to the rear simultaneously while one group of floor slats move forward. With this system, the group floor slats that reach the forward limit of travel and a group of floor slats that reach their rear limit of travel reverse directions, and the third group of floor slats continues to move to the rear. There are also systems which divide the floor slats into more than three groups.

The slide bearings 62 extend the full length of the reciprocating floor conveyor 10. The slide bearing 62 also extend from the right side wall 30 to the left side wall 32 with a small gap 340 between the wings 84 and 86 shown in FIG. 6. The gap 340 between the wings 84 and 86 is closed by the top section 102 of a floor slat 60 and the guide beams 46. The bottom surface 108 of each floor slat 60 is in sealing contact with the left wing bearing surface 88 and the right wing bearing surface 90. The left guide beam engaging surface 85 of the left wing 84 is in sealing contact with the horizontal top support plate 56 of the guide beam 46. The right guide beam engaging surface 89 is in sealing contact with the horizontal top support plate 54 of the guide beam 46. Gravity, the weight of the floor slat 60 and cargo supported by the floor slats 60 insure a satisfactory seal between the bottom surface 108 of the floor slat 60 and the guide beam 46. The side 50 and 52 and the base 48 close the guide beams 46. Each guide beam 46 has a section removed between the cross beams 236 and 238 of the floor slat drive assembly 58. Removal of the sections is required to provide space for the drive beams 210, 212, and 214. The slide bearings 62 extend across the space between the cross beams 236 and 238 and maintain a seal between the floor slats 60 and the underside of the trailer 12. The floor slat drive assembly 58 is normally in a position just to the rear of the landing gear 26 that is not exposed to large quantities of water and other contaminates on a road surface. However, a bottom cover for the floor slat drive assembly 58 can be employed if needed.

The drive beams 210, 212 and 214 support the floor slats 60 and any cargo on the floor slats and above the drive beams. The lower surface 68 of the slide bearing 62 is either in sliding contact with the drive beams 210, 212, and 214 or slightly above the drive beams and contact between the wing 84 and 86 of the slide bearings 62 and the bottom surface 108 of the floor slat 60 is maintained.

The drive beams 210, 212 and 214 include floor slat connectors 216, 220, and 222 as described above. Slots 342 and 344 are formed by removing a portion of the right wing 86 of one slide bearing 62 and a portion of the left wing 84 of an adjacent slide bearing. The two slots 342 and 344 form a large slot that receives a floor slat connector 216 as shown in FIG. 6. The length of the large slot formed by the slots 342 and 344 is at least the length of the floor slat connector plus the distance the drive beam 210 and a floor slat 260 is moved by the floor slat drive assembly 58. The length of the slots 342 and 344 is increased slightly from the minimum required length to accommodate changes or variations in the stroke of the drive beams 210, 212 and 214 due to wear, maintenance and repair of the floor slat drive assembly. The position of the slots 342 and 344 along the center axis 20 of the floor conveyor 10 is staggered to accommodate the positions of the floor slat connectors 216, 220 and 222. Since the floor slat connectors 216 on the drive beam 210 extend further toward the rear discharge opening 40 then the connectors 220 on the drive beam 212, the guide beams 46 adjacent to both sides of the floor slat connector 216 may extend forward a short distance further than the guide beam that is in for and after alignment with the floor slat connector 216 on the rear drive beam 210.

The disclosed embodiment is representative of a presently preferred form of the invention, but is intended to be illustrative rather than definitive thereof. The invention is defined in the claims.

We claim:

1. A reciprocating floor conveyor slide bearing comprising an elongated horizontal central base including a base front end, a base rear end, a base left side, a base right side, a plurality of crossbeam engaging surfaces, a first floor slat upwardly facing bearing surface, and a second floor slat upwardly facing bearing surface;

a left side wall integral with the base left side extending upward from the horizontal base and from the base front end to the base rear end;

a right side wall integral with the base right side and extending upward from the horizontal base and from the base front end to the base rear end;

a left wing integral with a left side top of the left side wall, extending to the left of the left side wall, having a guide beam engaging left wing bottom surface and a left wing top bearing surface;

a right wing integral with a right side top of the right side wall, extending to the right of the right side wall, having a guide beam engaging right wing bottom surface and a right wing top bearing surface; and wherein in the reciprocating floor conveyor slide bearing extends from a first end of a floor conveyor to a second end of the floor conveyor.

2. A reciprocating floor conveyor, slide bearing, as set forth in claim 1, including a left side wall upper finger that engages a first guide beam, a right side wall upper finger that engages a second guide beam, and wherein the left side wall upper finger and right side wall upper finger limit upward movement of the reciprocating floor conveyor slide bearing and close an opening between a first guide beam, a second guide beam, a conveyor front end and a conveyor rear end.

3. A reciprocating floor conveyor, slide bearing, as set forth in claim 1, wherein the reciprocating floor conveyor slide bearing is an extruded plastic material.

4. A reciprocating floor conveyor slide bearing, as set forth in claim 1, wherein the reciprocating floor conveyor slide bearing is an ultra high molecular weight plastic.

5. A reciprocating floor conveyor slide bearing, as set forth in claim 1, including;

a left side wall upper finger that cooperates with the guide beam engaging left wing bottom surface to form a left guide beam engaging slot that extends from the base front end and to the base rear end; and a right side wall upper finger that cooperates with the guide beam engaging right wing bottom surface to form a right guide beam engaging slot that extends from the base front end to the base rear end.

6. A reciprocating floor conveyor slide bearing, as set forth in claim 1, including:

a left lower finger extending laterally inward from the left side wall and cooperating with the first floor slat upwardly facing bearing surface to form a first floor slat second bottom flange receiving lower slot; and a right lower finger extending laterally inward from the right side wall and cooperating with the second floor slat upwardly facing bearing surface to form a second floor slat first bottom flange receiving lower slot.

7. A reciprocating floor conveyor slide bearing comprising;

an elongated horizontal central base including a base front end, a base rear end, a base left side, a base right side, a plurality of cross beam engaging bottom surfaces, a first floor slat upwardly facing surface, and a second floor slat upwardly facing bearing surface;

a left side wall integral with the base left side extending upward from the horizontal base to a left side wall top and from the base front end to the base rear end;

a right side wall integral with the base right side extending upward from the horizontal base to a right side wall top and from the base front end to the base rear end;

a left wing integral with the left side wall top, extending to the left of the left side wall, and having a guide beam engaging left wing bottom surface and a left wing top bearing surface;

a right wing integral with the right side wall top, extending to the right of the right side wall, and having a guide beam engaging right wing bottom surface and a right wing top bearing surface;

a left side wall upper finger that cooperates with the guide beam engaging left wing bottom surface to form a left guide beam engaging slot that extends from the base front end to the base rear end;

a right side wall upper finger that cooperates with the guide beam engaging right wing bottom surface to form a right guide beam engaging slot that extends from the base front end to the base rear end;

a left lower finger extending laterally inward from the left side wall and cooperating with the first floor slat upwardly facing bearing surface to form a first floor slat second bottom flange receiving lower slot; and a right lower finger extending laterally inward from the right side wall and cooperating with the second floor slat upwardly facing bearing surface to form a second floor slat first bottom flange receiving lower slot.

8. A reciprocating floor conveyor slide bearing, as set forth in claim 7, wherein the left side wall upper finger, the right side wall upper finger, the left lower finger and the right lower finger extend from the base front end to the base rear end.

9. A reciprocating floor conveyor slide bearing, as set forth in claim 7, wherein the reciprocating floor conveyor slide bearing closes an opening between a first guide beam, a second guide beam, a conveyor front end and a conveyor rear end thereby preventing loss of cargo as well as preventing cargo contamination due to the passage of cargo as well as contaminates through the opening.

10. A reciprocating floor conveyor slide bearing, as set forth in claim 7, including a first slat connector slot in the left wing and a second slat connector slot in the right wing.

11. A method of preventing cargo loss and preventing cargo contamination in a cargo container with a reciprocating slat floor conveyor having a plurality of cross beams and a plurality of guide beams comprising:

inserting a slide bearing between a left guide beam and a right guide beam with a bearing base sitting on the plurality of cross beams and with a left bearing wing in sealing contact with the left guide beam and a right bearing wing in sealing contact with a right guide beam;

locking the slide bearing in place to limit vertical movement of the slide bearing relative to the left guide beam and the right guide beam;

holding the left bearing wing and the right bearing wing of the slide bearing in sealing contact with a left guide beam and a right guide beam by positioning the first floor slat in sliding engagement with the left bearing wing and a second floor slat in sliding engagement with the right bearing wing; and restraining the first floor slat and the second floor slat from vertical movement relative to the left guide beam and the right guide beam.

* * * * *